(12) United States Patent
Tkacik et al.

(10) Patent No.: US 7,969,179 B2
(45) Date of Patent: Jun. 28, 2011

(54) METHOD AND APPARATUS FOR INCREASING SECURITY IN A SYSTEM USING AN INTEGRATED CIRCUIT

(75) Inventors: Thomas E. Tkacik, Phoenix, AZ (US); Asaf Ashkenazi, San Diego, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 42 days.

(21) Appl. No.: 12/414,752

(22) Filed: Mar. 31, 2009

(65) Prior Publication Data

US 2010/0244888 A1    Sep. 30, 2010

(51) Int. Cl.
*H03K 19/00* (2006.01)
(52) U.S. Cl. .......................................... 326/8
(58) Field of Classification Search ................ 326/8
See application file for complete search history.

(56) References Cited

U.S. PATENT DOCUMENTS

| | | | | |
|---|---|---|---|---|
| 4,812,675 A | * | 3/1989 | Goetting | 326/8 |
| 5,638,520 A | | 6/1997 | Moyer | |
| 6,298,400 B1 | * | 10/2001 | Candelore | 710/71 |
| 7,103,782 B1 | | 9/2006 | Tugenberg et al. | |
| 7,479,798 B1 | * | 1/2009 | Reese | 326/8 |

* cited by examiner

*Primary Examiner* — Rexford N Barnie
*Assistant Examiner* — Thienvu V Tran

(57) ABSTRACT

An integrated circuit can be made more secure by programming a one time programmable circuit so that different signals are provided on terminals as compared to when the integrated circuit was not secure. Instead, or in addition, the integrated circuit can be made more secure by providing decode circuitry that can be used with the one time programmable circuit to select different internal address maps in response to an address value. The decode circuitry can use a first address map when the integrated circuit is secure, and a different address map when the integrated circuit is non-secure.

15 Claims, 5 Drawing Sheets

| NON-SECURED DEVICE ADDRESS MAP | | |
|---|---|---|
| ADDRESS[31:0] | SIZE | SIGNALS |
| A000_0000 AFFF_FFFF | 256M | CHIP SELECT 101 |
| B000_0000 BFFF_FFFF | 256M | CHIP SELECT 102 |
| C000_0000 C7FF_FFFF | 128M | CHIP SELECT 103 |
| C800_0000 CFFF_FFFF | 128M | CHIP SELECT 104 |
| 73FB_8000 73FB_BFFF | 16K | MODULE 58 |
| 73FB_C000 73FB_FFFF | 16K | MODULE 61 |
| 73FB_0000 73FB_3FFF | 16K | MODULE 62 |
| 73FB_4000 73FB_7FFF | 16K | MODULE 63 |

FIG. 6

| SECURED DEVICE ADDRESS MAP | | |
|---|---|---|
| ADDRESS[31:0] | SIZE | SIGNALS |
| 9000_0000 9FFF_FFFF | 256M | CHIP SELECT 101 |
| A000_0000 AFFF_FFFF | 256M | CHIP SELECT 102 |
| B000_0000 B7FF_FFFF | 128M | CHIP SELECT 103 |
| B800_0000 BFFF_FFFF | 128M | CHIP SELECT 104 |
| 73FB_0000 73FB_3FFF | 16K | MODULE 58 |
| 73FB_4000 73FB_7FFF | 16K | MODULE 61 |
| 73FB_8000 73FB_BFFF | 16K | MODULE 62 |
| 73FB_C000 73FB_FFFF | 16K | MODULE 63 |

FIG. 7

METHOD AND APPARATUS FOR INCREASING SECURITY IN A SYSTEM USING AN INTEGRATED CIRCUIT

BACKGROUND

1. Field

This disclosure relates generally to a system using an integrated circuit (IC), and more specifically, to increasing security in a system which uses an integrated circuit.

2. Related Art

Security is a significant issue for many systems that use integrated circuits. As hackers become more capable and sophisticated, new security approaches are needed to safeguard systems and to thwart the efforts of such hackers.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 6 illustrates, in tabular form, a non-secured device address map in accordance with one exemplary embodiment.

FIG. 7 illustrates, in tabular form, a secured device address map in accordance with one exemplary embodiment.

DETAILED DESCRIPTION

Figure 2:
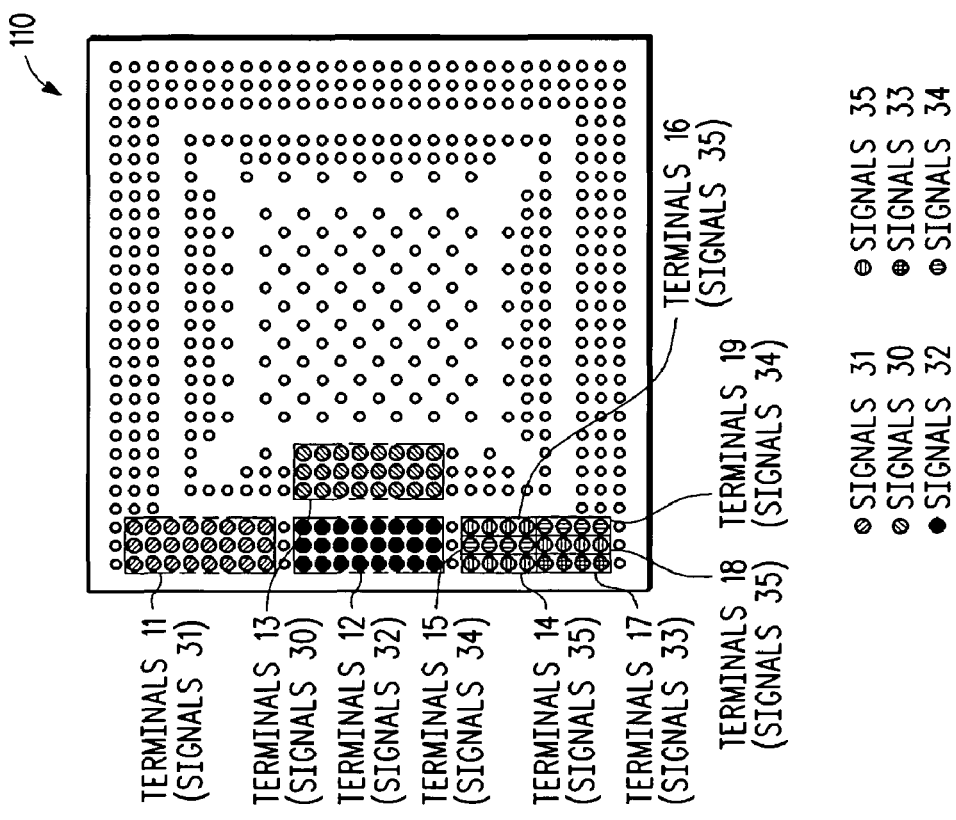
FIG. 2 illustrates a bottom view of a packaged integrated circuit 110 in accordance with one exemplary embodiment.

Many products today which contain integrated circuits (e.g. cell phones, personal computers, etc.) utilize a significant amount of security to prevent hackers from gaining access to confidential information; while other products containing integrated circuits (e.g. home appliances, etc.) require little or no security. For cost saving purposes, the manufacturers of integrated circuits often desire to use the same integrated circuit design for both types of applications: namely those applications that require security, and those applications that do not. When such integrated circuits leave the production facility, the integrated circuits are generally not customized and the security features on the integrated circuits are not enabled. Later in the product life cycle, the IC customer can customize the integrated circuit by enabling its security features and thus turning on the IC's security features.

However, the availability of similar ICs, some of which are secured and some of which are non-secured, creates a concern among IC customers who use the secure customized ICs. The security of some products may be based upon the security of one or more secure customized ICs. One concern is that a hacker might be able to replace the existing (and secure) customized IC in a product with a compatible chip that does not have the security features enabled, thus bypassing the on-chip security mechanisms (e.g. secure software for booting up a processor). This is a potentially serious issue.

What is needed is a method and apparatus to ensure that non-secure ICs cannot be used in products that use secured ICs, without requiring the IC manufacturer to design, manufacture, and stock two separate part numbers for the secure and non-secure versions of an IC.

In one embodiment, an IC customer is allowed to modify the external pin assignment for an IC. For some embodiments, this modification may be performed as part of the security customization process performed by the customer. Thus, when a customer customizes an IC to be secured, the pin locations for one or more selected signals may be changed in a way that prevents or makes it very difficult to use a non-secure IC in place of a secure IC on a printed circuit board. For example, replacement of a secure IC with a non-secure IC would require significant and expensive redesign of the printed circuit board by the hacker. And as a result, the hacker is less likely to bother hacking a system that utilizes one or more such secure ICs.

In alternate embodiments, an IC customer is allowed to modify one or more addresses in the internal address map for an IC. For some embodiments, this modification may be performed as part of the security customization process performed by the customer. Thus, when a customer customizes an IC to be secured, one or more addresses in the internal address map may be changed in a way that prevents or makes it very difficult to use a non-secure IC in place of a secure IC on a printed circuit board. For example, replacement of a secure IC with a non-secure IC would require significant and expensive modifications to the software interacting with the IC.

In yet other embodiments, an IC customer may be allowed to modify both the external pin assignment(s) as well as address(es) in the internal address map for an IC. For some embodiments, these modifications may be performed as part of the security customization process performed by the customer. Thus, when a customer customizes an IC to be secured, the pin location(s) for one or more selected signals as well as the address(es) in the internal address map may be changed in a way that prevents or makes it very difficult to use a non-secure IC in place of a secure IC on a printed circuit board. For example, replacement of a secure IC with a non-secure IC would require significant and expensive redesign of both the printed circuit board and the software running on the IC by the hacker. And as a result, the hacker is less likely to bother hacking a system that utilizes one or more such secure ICs.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
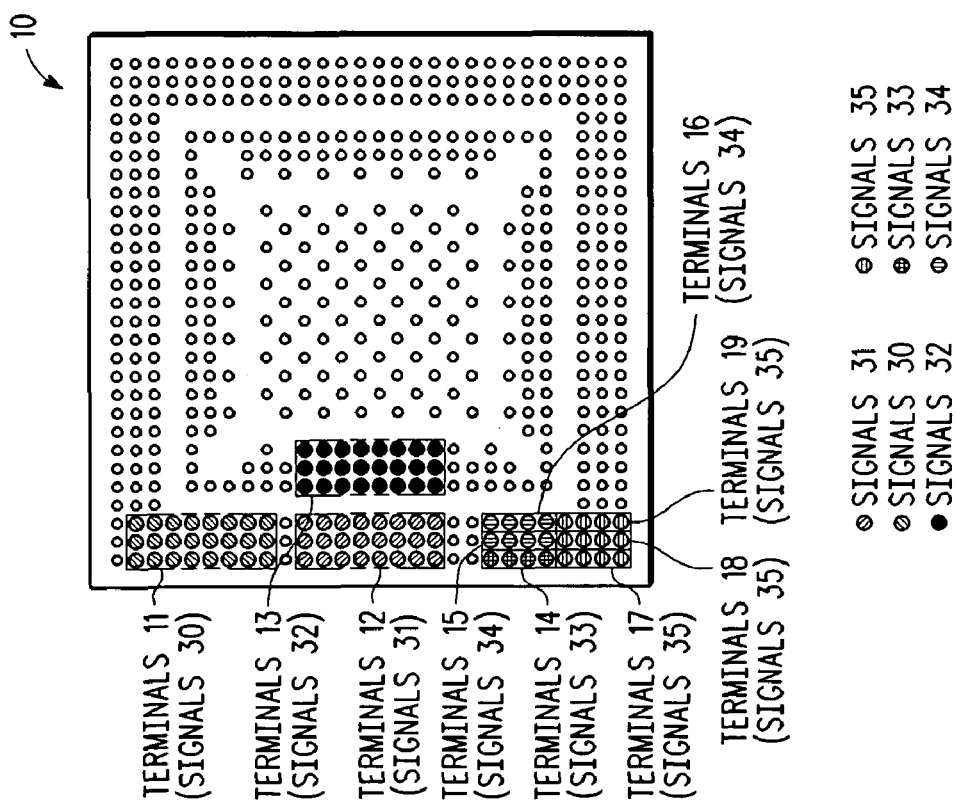
FIG. 1 illustrates a bottom view of a packaged integrated circuit 10 in accordance with one exemplary embodiment.

FIG. 1 illustrates the external terminals on the underside of a packaged integrated circuit device 10 in accordance with one exemplary embodiment. In the illustrated embodiment, integrated circuit 10 is a non-secured IC having the illustrated pin assignment.

Note that the term "pin" and "terminal" will be used interchangeably in this document to indicate any type of apparatus that allows the circuitry on an integrated circuit to make an electrical connection to circuitry external to the integrated circuit. For a packaged integrated circuit, the "terminals" or "pins" may be any type of apparatus capable of transferring an electrical signal, such as, for example, integrated circuit pins, solder bumps or other conductive bumps, wires, etc. For an unpackaged integrated circuit, the terminals may be any type of apparatus capable of transferring an electrical signal, such as, for example, conductive pads, solder bumps or other conductive bumps, wires, etc.

In the exemplary embodiment illustrated in FIG. 1, terminals 11 comprise a 3×8 array of terminals; terminals 12 comprise a 3×8 array of terminals; terminals 13 comprise a 3×8 array of terminals; terminals 14 comprise a 1×4 array of terminals; terminals 15 comprise a 1×4 array of terminals; terminals 16 comprise a 1×4 array of terminals; terminals 17 comprise a 1×4 array of terminals; terminals 18 comprise a 1×4 array of terminals; and terminals 19 comprise a 1×4 array of terminals. In the exemplary embodiment illustrated in FIG. 1, signals 30 will be transferred via terminals 11; signals 31 will be transferred via terminals 12; signals 32 will be transferred via terminals 13; signals 33 will be transferred via terminals 14; signals 34 will be transferred via terminals 15 and 16; and signals 35 will be transferred via terminals 17-19.

FIG. 2 illustrates the external terminals on the underside of a packaged integrated circuit device 110 in accordance with one exemplary embodiment. In the illustrated embodiment, integrated circuit 110 is a secured IC having a different pin assignment than non-secured IC 10 illustrate in FIG. 1. In one embodiment, device 110 is produced by taking device 10 of FIG. 1 and enabling one or more security features. Note that although the physical terminals 11-19 of IC 110 (see FIG. 2) are physically the same as terminals 11-19 of IC 10 (see FIG. 1), and the signals 30-35 transferred to or from IC 110 are the same as the signals 30-35 transferred to or from IC 10, the relationship or mapping between the terminals 11-19 and the signals 30-35 have been changed.

In the exemplary embodiment illustrated in FIG. 2, terminals 11 comprise a 3×8 array of terminals; terminals 12 comprise a 3×8 array of terminals; terminals 13 comprise a 3×8 array of terminals; terminals 14 comprise a 1×4 array of terminals; terminals 15 comprise a 1×4 array of terminals; terminals 16 comprise a 1×4 array of terminals; terminals 17 comprise a 1×4 array of terminals; terminals 18 comprise a 1×4 array of terminals; and terminals 19 comprise a 1×4 array of terminals. In the exemplary embodiment illustrated in FIG. 2, signals 31 (not signals 30) will be transferred via terminals 11; signals 32 (not signals 31) will be transferred via terminals 12; signals 30 (not signals 32) will be transferred via terminals 13; signals 35 (not signals 33) will be transferred via terminals 14; signals 34 will be transferred via terminals 1 5; signals 35 (not signals 34) will be transferred via terminals 16; signals 33 (not signals 35) will be transferred via terminals 17; signals 35 will be transferred via terminals 18; and signals 34 (not signals 35) will be transferred via terminals 19.

In alternate embodiments, the various arrays of terminals (e.g. 11-19) in FIGS. 1 and 2 may comprise any number of terminals and can be located anywhere in relation to the non-secured integrated circuit. In the illustrated embodiment, terminals 11-19 are conductive bumps on a bottom surface of an integrated circuit package containing a non-secured integrated circuit. Alternate embodiments may or may not comprise a package, and may use one or more other types of terminals instead of or in addition to conductive bumps. However, device 10 will comprise a non-secured integrated circuit, and device 110 will comprise a secured integrated circuit.

Note that a non-secured device 10 may not be used as a replacement for secured device 110 on a printed circuitry board. Although device 10 provides or expects to receive signals 30-35 by way of terminals 11-19, the mapping of which signals are to be provided or received by which terminals is different for non-secured device 10 than for secured device 110. And as a result, replacing a secured device 110 on a printed circuit board with a non-secured device 10 causes the printed circuit board to no longer function properly; thus, thwarting a hacker who is trying to circumvent the security features of secured IC 110.

Figure 3:
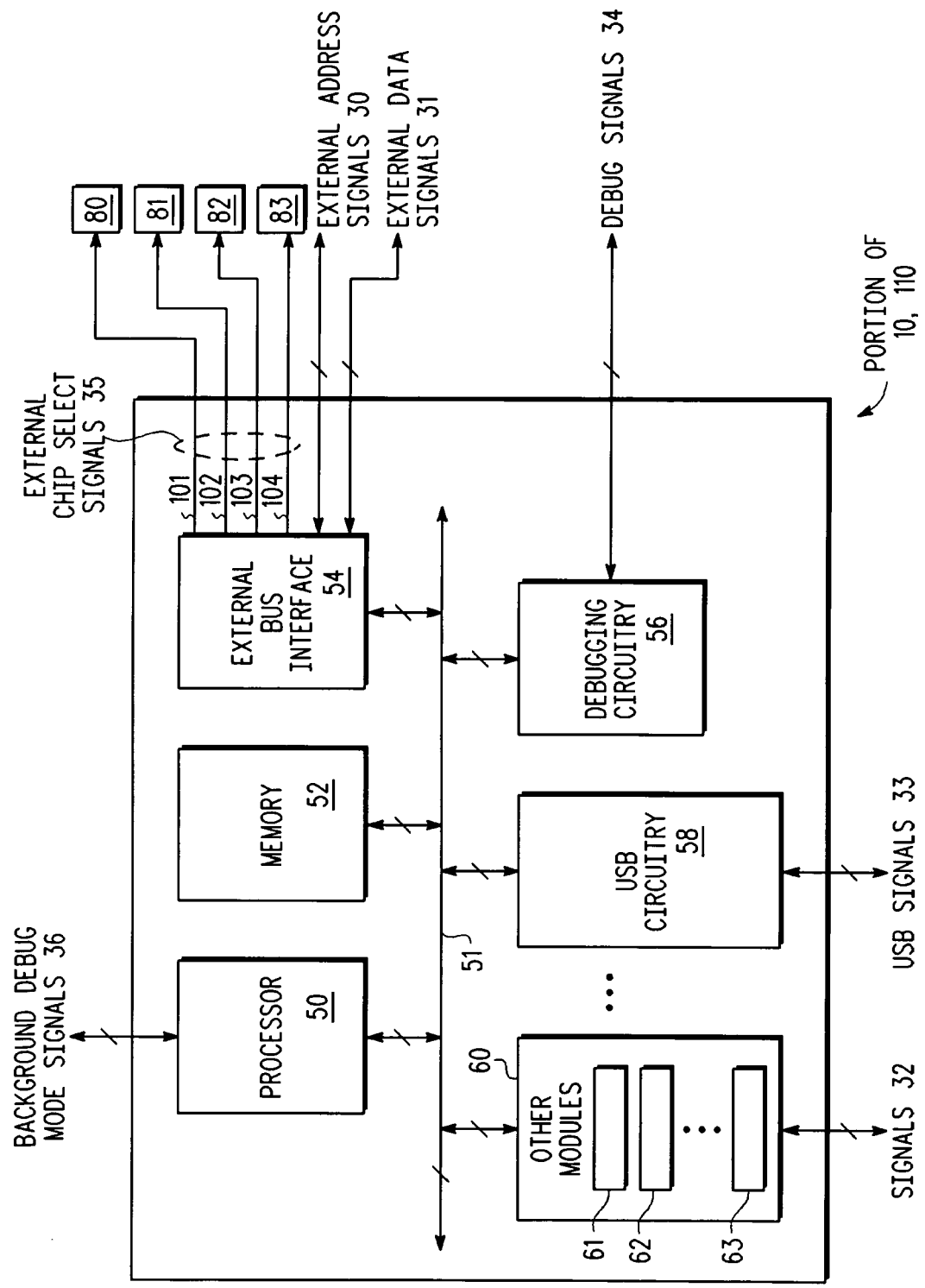
FIG. 3 illustrates, in block diagram form, a portion of integrated circuit 10 and 110 in accordance with one exemplary embodiment.

FIG. 3 illustrates, in block diagram form, a portion of integrated circuit 10 and 110 in accordance with one exemplary embodiment. In the illustrated embodiment, ICs 10 and 110 comprise at least one processor 50, at least one memory 52, at least one external bus interface 54, at least one debugging circuitry 56, at least one USB circuitry 58, and at least one other modules 60, which are all bi-directionally coupled to each other by way of a bus 51. In the illustrated embodiment, other modules 60 comprise one or more modules 61-63. In alternate embodiments, any one or more of circuitry 50, 52, 54, 56, 58, or 60 may not be present on ICs 10, 110. In addition, alternate embodiments of ICs 10, 110 may comprise additional circuitry (not shown) other than that illustrated in FIG. 3. In fact, alternate embodiments of ICs 10, 110 may comprise any desired and appropriate circuitry. Thus, ICs 10, 110 may be any type of integrated circuit. The particular function of ICs 10, 110 is not important. What is important is that ICs 10, 110 have different mapping of signals to external terminals (e.g. 11-19) and/or different mapping of addresses in the internal address map. Note that taking an individual non-secured IC 10 and enabling selected security features may result in producing IC 110 which is now secured. Other than the enabled security features, the original functionality of IC 10 may remain the same for IC 110. In alternate embodiments, the enabling of certain security features may affect the functionality of IC 110, if desired.

In the exemplary embodiment illustrated in FIG. 3, signals 30 may be a plurality of external address signals transferred to and/or from external bus interface 54; signals 31 may be a plurality of external data signals transferred to and/or from external bus interface 54; signals 32 may be a plurality of signals transferred to and/or from one or more modules 61-63; signals 33 may be a plurality of USB signals transferred to and/or from USB circuitry 58; signals 34 may be a plurality of debug signals transferred to and/or from debug circuitry 56; signals 35 may be a plurality of external chip select signals transferred from external bus interface 54; and signals 36 may be a plurality of background debug mode signals transferred to and/or from processor 50. In some embodiments, background debug signals 36 may be used in FIGS. 1 and 2 in place of debug signals 34.

In the illustrated embodiment, a first one of chip select signals 35 is transferred to external IC 80 by way of conductor 101; a second one of chip select signals 35 is transferred to external IC 81 by way of conductor 102; a third one of chip select signals 35 is transferred to external IC 82 by way of conductor 103; and a fourth one of chip select signals 35 is transferred to external IC 83 by way of conductor 104. In one embodiment of ICs 10, 110 (see FIGS. 1-2), there are twelve external chip select signals 35. Four of the twelve external chip select signals 35 are expressly shown in FIG. 3; the remaining eleven external chip select signals 35 (not shown in FIG. 3) may be transferred from external bus interface 54 to other external devices (e.g. similar to ICs 80-83) via conductors (e.g. similar to conductors 101-104).

Figure 4:
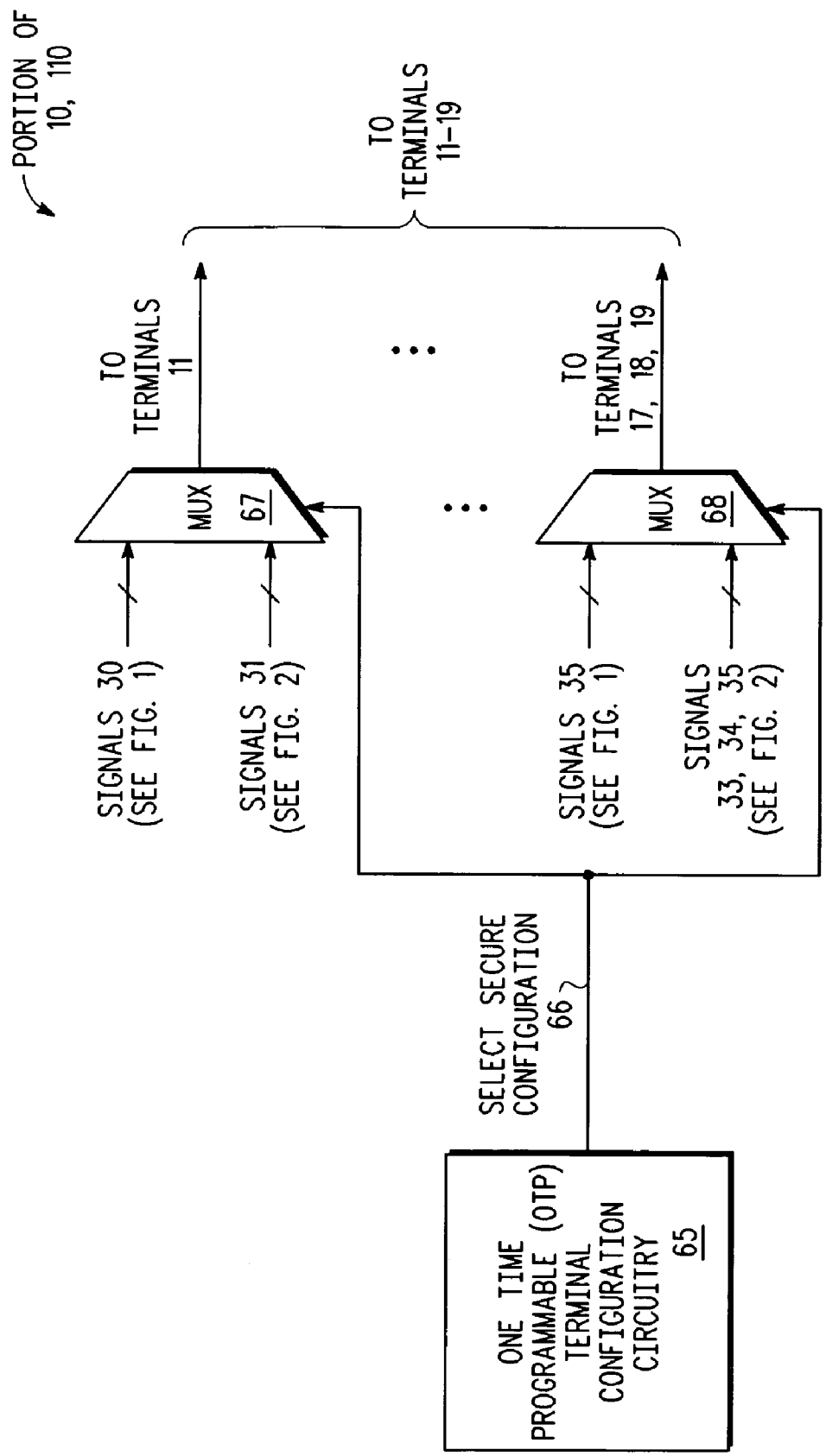
FIG. 4 illustrates, in block diagram form, a portion of integrated circuit 10 and 110 in accordance with one exemplary embodiment.

FIG. 4 illustrates, in block diagram form, a portion of integrated circuit 10 and 110 in accordance with one exemplary embodiment. In one embodiment, ICs 10, 110 comprise one time programmable (OTP) terminal configuration circuitry 65. Any type of one time programmable circuitry may be used to program circuitry 65, such as, for example, various types of OTP memory (e.g. EPROM, erasable programmable read only memory, that is packaged so that it is not accessible by ultraviolet light), various types of fuses (e.g. electrically programmable fuses), or any other type of circuitry that is effectively programmable only once.

Referring to FIGS. 1 and 2, in one embodiment, the difference between IC 10 and IC 110 is that the OTP terminal configuration circuitry 65 in IC 10 has been programmed in a first way and the OTP terminal configuration circuitry 65 in IC 110 has been programmed in a second way, wherein the second way is different than the first way.

Providing OTP terminal configuration circuitry 65 of IC 10 with a first set of values (e.g. the default values after manufacture of IC 10 before any programming has taken place) provides select signals 66 that select a first mapping between signals 30-35 and terminals 11-19 (see FIG. 1). In this first configuration, select signals 66 cause multiplexer (MUX) 67 to selectively couple signals 30 (not signals 31) to terminals 11; and select signals 66 cause MUX 68 to selectively couple twelve external chip signals 35 (not signals 33, four external chip select signals 35, and signals 34, respectively) to terminals 17-19.

Programming OTP terminal configuration circuitry 65 of IC 110 with a second set of values (different than the first set of values for IC 10) provides select signals 66 that select a second mapping between signals 30-35 and terminals 11-19 (see FIG. 2). In this second configuration, select signals 66 select a secure configuration and cause MUX 67 to selectively couple signals 31 (not signals 30) to terminals 11; and select signals 66 select a secure configuration and cause MUX 68 to selectively couple signals 33, four of the twelve external chip select signals 35 (via conductors 101-104, see FIG. 3), and signals 34, respectively, to terminals 17-19 (not all twelve external chip select signals 35).

Note that for one embodiment, each set of terminals 12-16 will be coupled to a corresponding MUX with a select input coupled to select signals 66 and with data inputs for selected ones of signals 30-35. In the embodiment illustrated in FIGS. 1-2, the MUX for terminals 12 will have a first data input for signals 31 and a second data input for signals 32; the MUX for terminals 13 will have a first data input for signals 32 and a second data input for signals 30; the MUX for terminals 14 will have a first data input for signals 33 and a second data input for a first portion of signals 35; the MUX for terminals 15 will have a first data input for a first portion of signals 34 and a second data input for a second portion of signals 34; the MUX for terminals 16 will have a first data input for a second portion of signals 34 and a second data input for a second portion of signals 35; the MUX for terminals 17 will have a first data input for a first portion of signals 35 and a second data input for signals 33; the MUX for terminals 18 will have a first data input for a second portion of signals 35 and a second data input for a third portion of signals 35; and the MUX for terminals 19 will have a first data input for a third portion of signals 35 and a second data input for a second portion of signals 34.

Alternate embodiments may not have a corresponding MUX coupled to each and every set of terminals, but instead may only have a MUX coupled to a portion of the terminals. For example, in one embodiment, a corresponding MUX may not be coupled to terminals 15; instead, the same portion of signals 34 may be coupled to terminals 15 for both IC 10 and IC 110. Thus, for some embodiments, the mapping between a portion of the signals 30-35 and a portion of the terminals 11-19 may remain the same for both IC 10 and IC 110, while the mapping for a different portion of the signals 30-35 and a different portion of the terminals 11-19 may be different for IC 10 and IC 110.

Note that the embodiment illustrated in FIG. 4 is exemplary of terminals (e.g. 11-19) that are used as outputs. Alternate embodiments may use any one or more of terminals 11-19 as inputs. For embodiments where a plurality of terminals 11-19 are used as inputs, MUX 67 might alternately have a first data input coupled to a first plurality of terminals (e.g. terminals 11), have a second data input coupled to a second plurality of terminals (e.g. terminals 12), and have a data output coupled to the destination circuitry (e.g. external bus interface 54) intended to receive the information input from the terminals. In this embodiment, IC 10 would provide the external address signals 30 via terminals 11, while IC 110 would provide the external address signals 30 via terminals 12.

Figure 5:
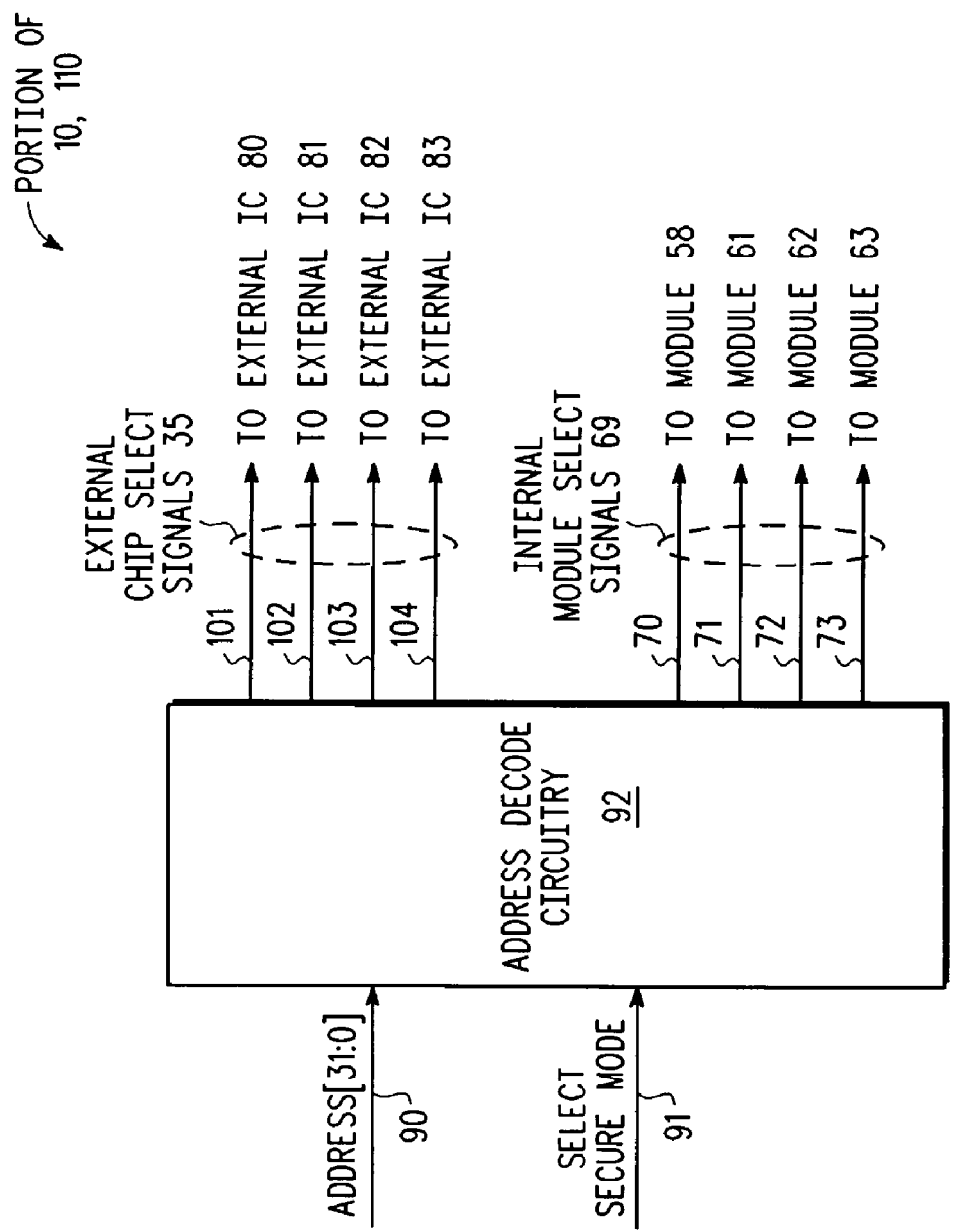
FIG. 5 illustrates, in block diagram form, a portion of integrated circuit 10 and 110 in accordance with one exemplary embodiment.

FIG. 5 illustrates, in block diagram form, a portion of integrated circuit 10 and 110 in accordance with one exemplary embodiment. The portion of IC 10, 110 illustrated in FIG. 5 illustrates one exemplary embodiment of circuitry that may be used to modify one or more addresses in the internal address map for an integrated circuit. FIG. 6 illustrates an exemplary address map that may be used with IC 10. Referring to FIG. 6, note that IC 10 may come out of the manufacturing process with a default address range associated with each corresponding chip select signal 101-104. Similarly, IC 10 may come out of the manufacturing process with a default address range associated with each internal module 58, 61-63. Note that for ICs 10 manufactured using an identical set of masks and processing steps, all ICs 10 will come out of the manufacturing process with the same internal address map, such as, for example, the non-secure device address map illustrated in FIG. 6.

Referring to FIG. 4, for some embodiments, the OTP terminal configuration circuitry 65 may also be used to provide one or more select secure mode signals 91 (see FIG. 5) in addition to providing one or more select secure configuration signals 66 (see FIG. 4). In alternate embodiments, the OTP circuitry 65 is not used to select a secure configuration for terminals (e.g. select secure configuration signals 66 and MUXes 67, 68 are not provided or not used); instead, OTP configuration circuitry 65 generates and provides the select secure mode signal 91 to address decode circuitry 92 (see FIG. 5). Address decode circuitry 92 also receives a plurality of address signals (e.g. address[31:0] in one exemplary embodiment). Alternate embodiments may use any number of address signals.

For non-secure IC 10, before OTP circuitry 65 has been programmed, address decode circuitry 92 performs the decode functionality described in the non-secure device address map illustrated in FIG. 6. For example, when address decode circuitry 92 receives an address via conductors 90 having an address value in the range between A000_0000 and AFFF_FFFF hexadecimal, address decode circuitry 92 will assert the chip select signal 101 that is provided to external IC 80 via conductor 101. As another example, when address decode circuitry 92 receives an address via conductors 90 having an address value in the range between 73FB_C000 and 73FB_FFFF hexadecimal, address decode circuitry 92 will assert one of the internal module select signals 69 that is provided to internal module 61 (via conductor 71). This will select internal module 61.

For secure IC 110, after OTP circuitry 65 has been programmed, address decode circuitry 92 performs the decode functionality described in the secure device address map illustrated in FIG. 7. For example, when address decode circuitry 92 receives an address via conductors 90 having an address value in the range between 9000_0000 and 9FFF_FFFF hexadecimal, address decode circuitry 92 will assert the chip select signal 101 that is provided to external IC 80 via conductor 101. As another example, when address decode circuitry 92 receives an address via conductors 90 having an address value in the range between 73FB_4000 and 73FB_7FFF hexadecimal, address decode circuitry 92 will assert one of the internal module select signals 69 that is provided to internal module 61 (via conductor 71). This will select internal module 61.

Note that after OTP circuitry 65 has been programmed to select a secure configuration of address decode circuitry 92 (e.g. by asserting the select secure mode signal 91), the software used to operate IC 110 will need to be different than the software used to operate IC 10. The address values used to access the various internal modules 58, 61-63 and the various external devices 80-83 are different for IC 110 than for IC 10. Note that the address decode circuitry 92 in both IC 10 and IC 110 may be the same; however the addresses used by the software is different. For IC 10, the select secure mode signal 91 is not asserted, and thus address decode circuitry 92 performs the decode operations illustrated in FIG. 6. And for IC 110, the select secure mode signal 91 is asserted, and thus address decode circuitry 92 performs the decode operations illustrated in FIG. 7. As a result, the software running on secure IC 110 will not function if secure IC 110 is removed and replaced with a non-secure IC 10. Thus, if a hacker removes a secure IC 110 and replaces it with a non-secure IC 10, the software that ran correctly on IC 110 will no longer function correctly on IC 10. The hacker has thus been thwarted.

By now it should be appreciated that there has been provided a programmable method and apparatus for selecting a secure mode for configuring the address mapping of internal modules and external devices and/or for configuring the mapping of internal signals to external terminals. Some embodiments will select a secure mode only for configuring the address mapping of internal modules and external devices. Some devices will select a secure mode only for configuring the mapping of internal signals to external terminals. And some devices will select a secure mode for both configuring the address mapping of internal modules and external devices and also for configuring the mapping of internal signals to external terminals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 3 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, separate OTP circuits may be used to generate signal 66 (see FIG. 4) and signal 91 (see FIG. 5). Alternately, in some embodiments, signal 66 may be the same signal as signal 91. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling. For example, all of the blocks of circuitry illustrated in FIGS. 3-5 are coupled to each other via one or more conductors and/or one or more circuit elements (e.g. transistors).

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text

1. A method, comprising:
   providing a first integrated for example (10) circuit having a security feature for example (65); and
   providing a second integrated circuit for example (10) having said security feature for example (65),
   wherein the first integrated circuit and the second integrated circuit are formed comprising identical circuitry,
   wherein when the security feature of the first integrated circuit is not enabled, the first integrated circuit comprises a non-secure integrated circuit for example (10 with 65 left unprogrammed and defaulting to a first value),
   wherein when the security feature of the second integrated circuit is enabled, the second integrated circuit comprises a secure integrated circuit for example (110 with 65 having been programmed to store and provide a second value different from the first value),
   wherein the secure integrated circuit for example (110) externally provides a first plurality of signals for example (32) via a first plurality of terminals for example (12), and
   wherein the non-secure integrated circuit for example (10) externally provides the first plurality of signals for example (32) via a second plurality of terminals for example (13) different from the first plurality of terminals, and wherein the non-secure integrated circuit is incapable of externally providing the first plurality of signals via the first plurality of terminals.
2. A method as in statement 1, or any other appropriate statement herein, wherein the security feature of the second integrated circuit is enabled by programming a one time programmable circuit for example (65) to a second value.
3. A method as in statement 2, or any other appropriate statement herein, wherein when the security feature of the first integrated circuit is not enabled, the one time programmable circuit is left unprogrammed and defaults to a first value, wherein the first value is different than the second value.
4. A method as in statement 2, or any other appropriate statement herein, wherein the one time programmable circuit for example (65) comprises an electrically programmable fuse.
5. A method as in statement 1, or any other appropriate statement herein, wherein the non-secure integrated circuit for example (10) externally provides a second plurality of signals for example (31) via the first plurality of terminals for example (12), wherein the second plurality of signals for example (31) is different than the first plurality of signals for example (32).
6. A method as in statement 1, or any other appropriate statement herein, wherein each one of the first plurality of terminals for example (12) and each one of the second plurality of terminals for example (13) comprises a conductive bump.
7. A method as in statement 1, or any other appropriate statement herein, wherein the enabling of the security feature of the second integrated circuit is permanent and cannot be reversed.
8. A method as in statement 1, or any other appropriate statement herein,
   wherein the secure integrated circuit for example (110) maps one of a chip select signal for example (102) or a module for example (61) to a first address value for example (A000_0000 for chip select signal 102 and 73FB_4000 for module 61), and
   wherein the non-secure integrated circuit for example (10) maps one of said chip select signal for example (102) or said module for example (61) to a second address value for example (B000_0000 for chip select signal 102 and 73FB_C000 for module 61) that is different than the first address value, wherein the non-secure integrated circuit is incapable of mapping said chip select signal for example (102) to the first address value for example (A000_0000), and wherein the non-secure integrated circuit is incapable of mapping said module for example (61) to the first address value for example (73FB_4000).
9. A method, comprising:
   providing a first integrated for example (10) circuit having a security feature for example (65); and
   providing a second integrated circuit for example (10) having said security feature for example (65),
   wherein the first integrated circuit and the second integrated circuit are formed comprising identical circuitry,
   wherein when the security feature of the first integrated circuit is not enabled, the first integrated circuit comprises a non-secure integrated circuit for example (10 with 65 left unprogrammed and defaulting to a first value),
   wherein when the security feature of the second integrated circuit is enabled, the second integrated circuit comprises a secure integrated circuit for example (110 with 65 having been programmed to store and provide a second value different from the first value),
   wherein the secure integrated circuit for example (110) maps one of a chip select signal for example (102) or a module for example (61) to a first address value for example (A000_0000 for chip select signal 102 and 73FB_4000 for module 61), and
   wherein the non-secure integrated circuit for example (10) maps one of said chip select signal for example (102) or said module for example (61) to a second address value for example (B000_0000 for chip select signal 102 and 73FB_C000 for module 61) that is different than the first address value, wherein the non-secure integrated circuit is incapable of mapping said chip select signal for example (102) to the first address value for example (A000_0000), and wherein the non-secure integrated circuit is incapable of mapping said module for example (61) to the first address value for example (73FB_4000).
10. A method as in statement 9, or any other appropriate statement herein, wherein the security feature of the second integrated circuit is enabled by programming a one time programmable circuit for example (65) to a second value.
11. A method as in statement 10, or any other appropriate statement herein, wherein when the security feature of the first integrated circuit is not enabled, the one time programmable circuit is left unprogrammed and defaults to a first value, wherein the first value is different than the second value.
12. A method as in statement 10, or any other appropriate statement herein, wherein the one time programmable circuit for example (65) comprises an electrically programmable fuse.
13. A method as in statement 9, or any other appropriate statement herein, wherein the first address value comprises a range of contiguous addresses.
14. A method as in statement 9, or any other appropriate statement herein, wherein the chip select signal for example (102) is transferred to a device for example (80) located external to the secure integrated circuit for example (110).

15. A method as in statement 9, or any other appropriate statement herein, wherein the module for example (61) is located on the secure integrated circuit for example (110).

16. A method as in statement 9, or any other appropriate statement herein, wherein the enabling of the security feature of the second integrated circuit is permanent and cannot be reversed.

17. An integrated circuit for example (10, 110), comprising:
    a one time programmable circuit (65) for providing at least one signal for example (66 and/or 91) for selecting a secure mode;
    multiplexer circuitry for example (67) coupled to the one time programmable circuit for example (65) for receiving the at least one signal for example (66) for selecting the secure mode, the multiplexer circuitry for example (67) selecting one of a first plurality of signals for example (30) and a second plurality of signals for example (31) to provide external to the integrated circuit via a first plurality of terminals for example (11);
    decode circuitry for example (92) coupled to the one time programmable circuit for example (65) for receiving the at least one signal for example (91) for selecting the secure mode, the decode circuitry for example (92) receiving an address value for example (90), the decode circuitry for example (92) decoding said address value in a first manner to select a first decoder output for example (chip select 101 for address A000_0000 for a non-secured IC), the decode circuitry for example (92) decoding said address value in a second manner to select a second decoder output for example (chip select 102 for address A000_0000 for a secured IC).

18. An integrated circuit as in statement 17, or any other appropriate statement herein, wherein the first decoder output causes a first chip select signal for example (101) to be asserted to select a first external device for example (80), and wherein the second decoder output causes a second chip select signal for example (102) to be asserted to select a second external device for example (81).

19. An integrated circuit as in statement 17, or any other appropriate statement herein, wherein the first decoder output causes a first internal module select signal for example (71 for address 73FB_C000 for a non-secured IC) to be asserted to select a first internal module for example (61), and wherein the second decoder output causes a second internal module select signal for example (73 for address 73FB_C000 for a secured IC) to be asserted to select a second internal module for example (63).

20. An integrated circuit as in statement 17, or any other appropriate statement herein, further comprising a processor for example (50) coupled to the decode circuitry for example (92) for providing the address value for example (90), said decode circuitry selecting one of a plurality of internal address maps for use by software executing on the processor, wherein a first one of the plurality of address maps is selected when the processor is in a secure mode, wherein a second one of the plurality of address maps is selected when the processor is in a non-secure mode, wherein the second one of the plurality of address maps is different than the first one of the plurality of address maps, and wherein the first one of the plurality of address maps is never selected when the processor is in the non-secure mode.

What is claimed is:

1. A method, comprising:
   providing a first integrated circuit having a first security feature; and
   providing a second integrated circuit having a second security feature,
   wherein the first integrated circuit and the second integrated circuit are formed comprising identical circuitry, and the first security feature is identical to the second security feature,
   wherein the first integrated circuit and the second integrated circuit each has a plurality of external terminals and a first external terminal assignment of the plurality of external terminals,
   wherein when the first security feature of the first integrated circuit is not enabled, the first integrated circuit comprises a non-secure integrated circuit having the first external terminal assignment,
   wherein when the second security feature of the second integrated circuit is enabled, the second integrated circuit comprises a secure integrated circuit having a second external terminal assignment, the second external terminal assignment being different from the first external terminal assignment,
   wherein the secure integrated circuit maps one of a chip select signal or a module to a first address value, and
   wherein the non-secure integrated circuit maps one of said chip select signal or said module to a second address value that is different than the first address value, wherein the non-secure integrated circuit is incapable of mapping said chip select signal to the first address value, and wherein the non-secure integrated circuit is incapable of mapping said module to the first address value, and
   wherein the second external terminal assignment of the secure integrated circuit is permanent and cannot be reversed.

2. A method as in claim 1, wherein the second security feature of the second integrated circuit is enabled by programming a one time programmable circuit to a second value.

3. A method as in claim 2, wherein when the first security feature of the first integrated circuit is not enabled, the one time programmable circuit is left unprogrammed and defaults to a first value, wherein the first value is different than the second value.

4. A method as in claim 2, wherein the one time programmable circuit comprises an electrically programmable fuse.

5. A method as in claim 1, wherein the first and second integrated circuit each comprise a debug circuit, wherein a first subset of the plurality of external terminals is assigned to the debug circuit when the first and second security features are not enabled, and a second subset of the plurality of external terminals is assigned to the debug circuit when the first and second security features are enabled, the second subset being different than the first subset.

6. A method as in claim 1, wherein each one of the plurality of external terminals comprises a conductive bump.

7. A method as in claim 1, wherein the enabling of the second security feature of the second integrated circuit is permanent and cannot be reversed.

8. A method, comprising:
   providing a first integrated circuit having a first security feature; and
   providing a second integrated circuit having a second security feature, wherein the first integrated circuit and the second integrated circuit are formed comprising identical circuitry, and the first security feature is identical to the second security feature, wherein when the first security feature of the first integrated circuit is not enabled, the first integrated circuit comprises a non-secure integrated circuit, wherein when the second security feature of the second integrated circuit is enabled, the second integrated circuit comprises a secure integrated circuit, wherein the secure integrated circuit maps one of a chip select signal or a module to a first address value, and wherein the non-secure integrated circuit maps one of said chip select signal or said module to a second address value that is different than the first address value, wherein the non-secure integrated circuit is incapable of mapping said chip select signal to the first address value, and wherein the non-secure integrated circuit is incapable of mapping said module to the first address value.

9. A method as in claim 8, wherein the second security feature of the second integrated circuit is enabled by programming a one time programmable circuit to a second value.

10. A method as in claim 9, wherein when the first security feature of the first integrated circuit is not enabled, the one time programmable circuit is left unprogrammed and defaults to a first value, wherein the first value is different than the second value.

11. A method as in claim 9, wherein the one time programmable circuit comprises an electrically programmable fuse.

12. A method as in claim 8, wherein the first address value comprises a range of contiguous addresses.

13. A method as in claim 8, wherein the chip select signal is transferred to a device located external to the secure integrated circuit.

14. A method as in claim 8, wherein the module is located on the secure integrated circuit.

15. A method as in claim 8, wherein the enabling of the second security feature of the second integrated circuit is permanent and cannot be reversed.

\* \* \* \* \*